March 9, 1943. J. E. DYREK 2,313,229
METHOD AND APPARATUS FOR STUFFING MEATS INTO CASINGS
Filed July 12, 1940 3 Sheets-Sheet 1
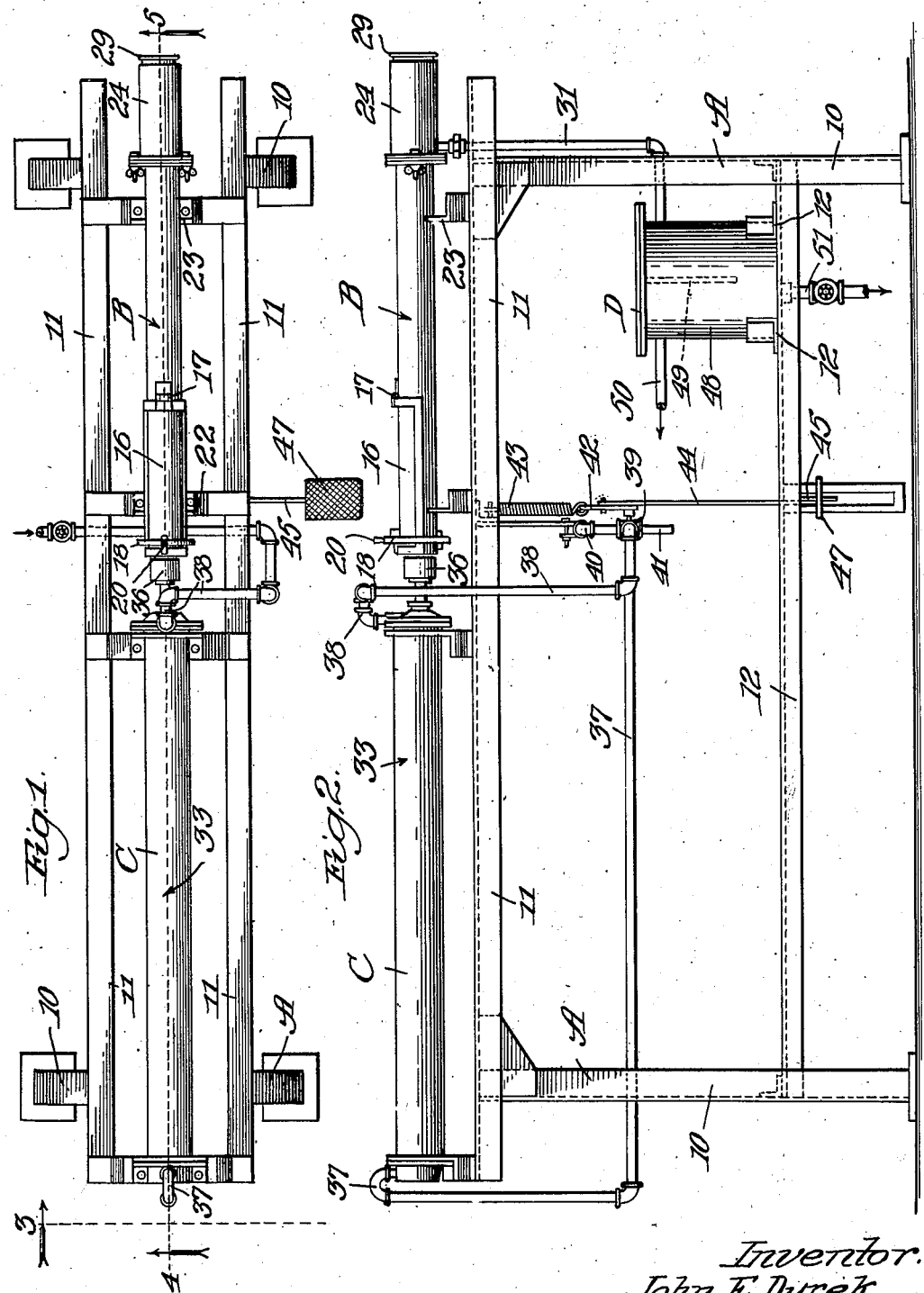
Inventor:
John E. Dyrek,
By Carl C. Batz
Atty.

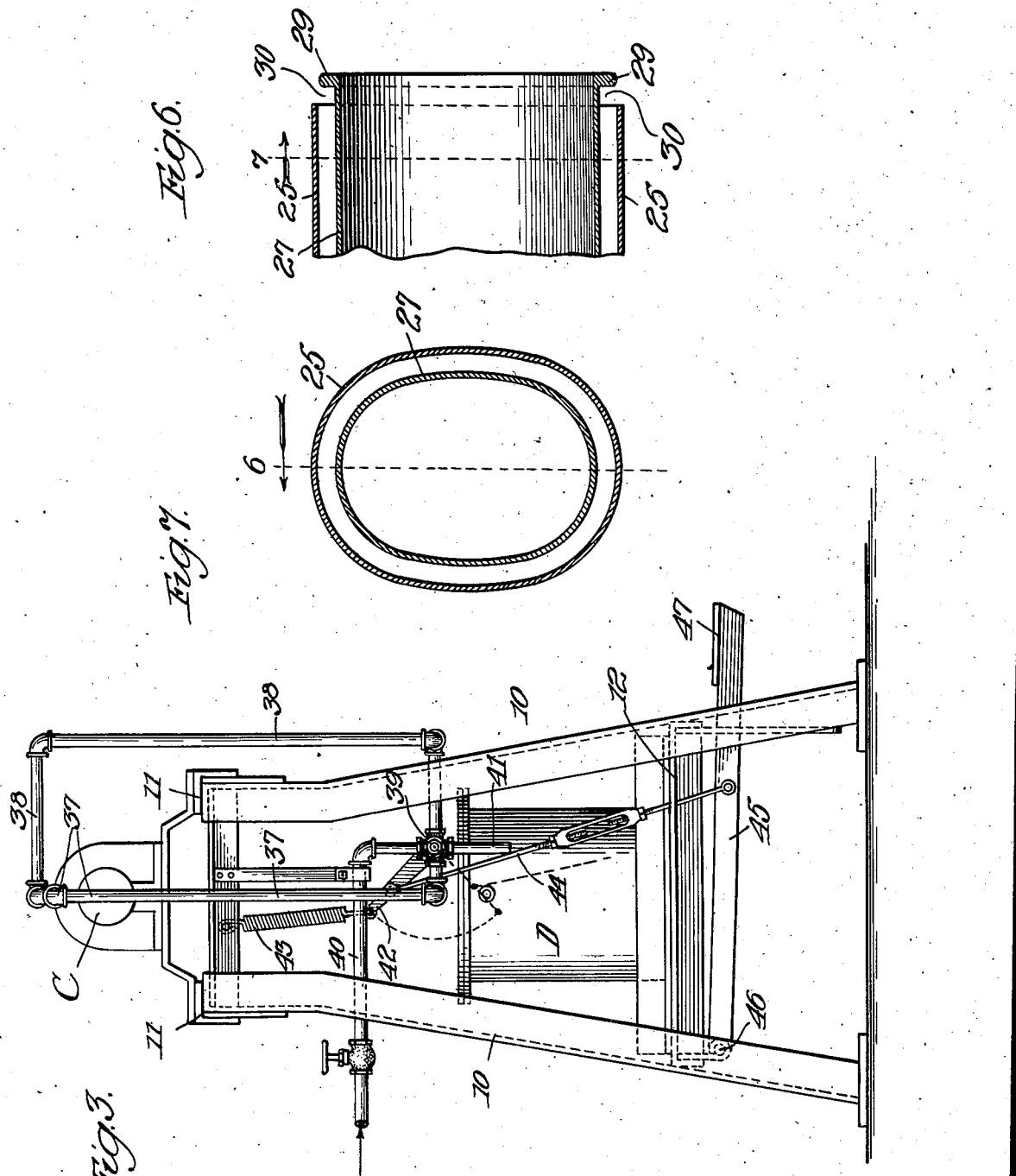

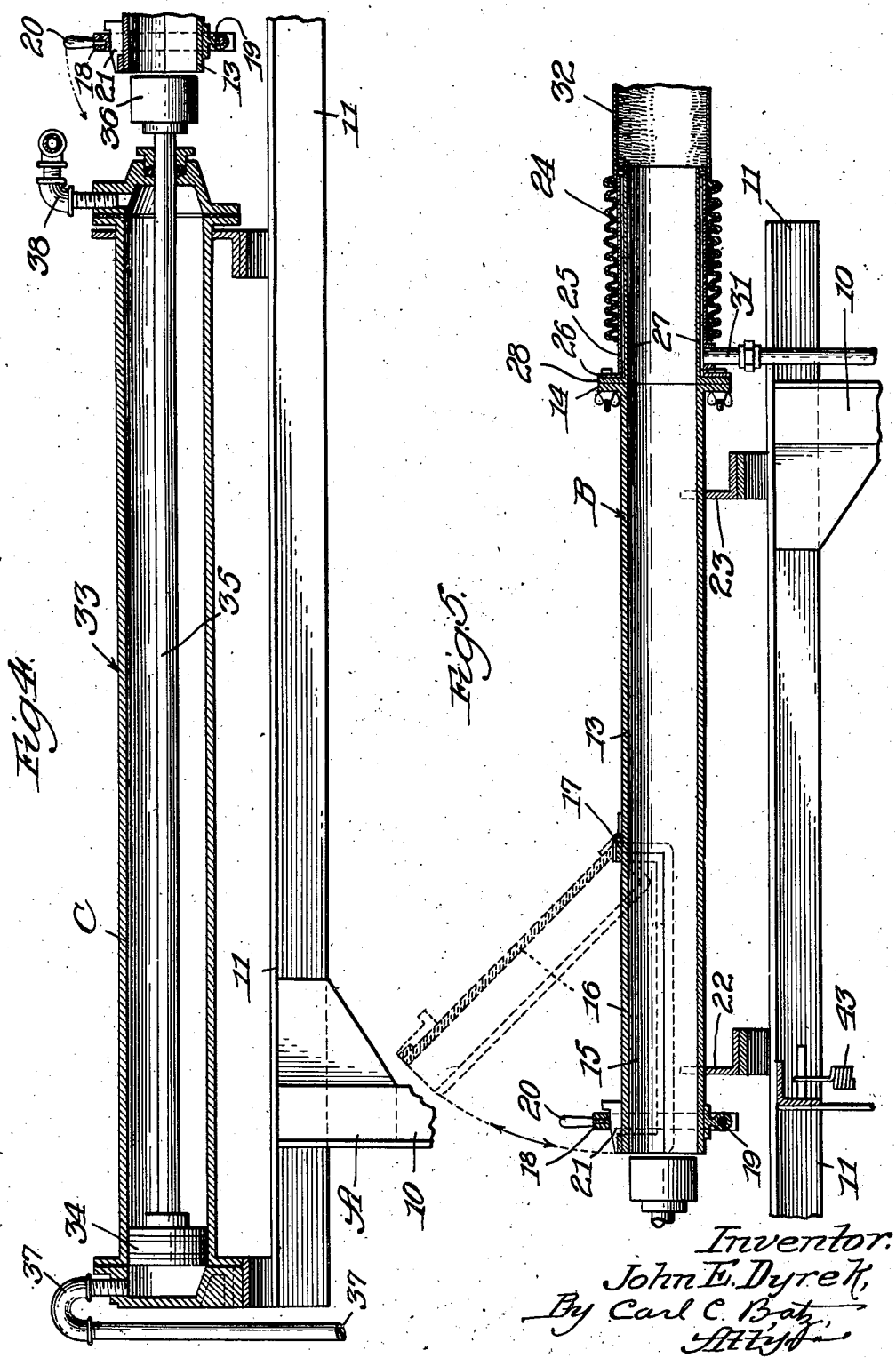

Patented Mar. 9, 1943

2,313,229

UNITED STATES PATENT OFFICE 2,313,229

METHOD AND APPARATUS FOR STUFFING MEATS INTO CASINGS

John E. Dyrek, Chicago, Ill., assignor to Armour and Company, Chicago, Ill., a corporation of Illinois Application July 12, 1940, Serial No. 345,039

13 Claims. (Cl. 17—35)

This invention relates to a method and apparatus for stuffing meats or the like into casings.

An object of the invention is to provide a simple and effective method and means for quickly removing air and moisture from meat as it is being stuffed into a casing. A further object is to provide a method and means for subjecting meat which is being pressed into a casing to the influence of partial vacuum. A further object is to provide apparatus whereby casings, either natural or artificial, may be readily stuffed while at the same time withdrawing air and moisture from the meat and trapping out the objectionable materials, etc., withdrawn with the exhausted air. A still further object is to provide new and improved apparatus in which meat may be readily passed into a tube and quickly pressed into the interior of a case, while at the same time withdrawing air and moisture from the casing, the withdrawing mechanism being equipped with a guard to prevent the withdrawal of meat, etc. Other specific objects and advantages will appear as the specification proceeds.

The invention is illustrated in a preferred embodiment, by the accompanying drawings, in which—

Figure 1 is a plan view of apparatus embodying my invention; Fig. 2, a side view in elevation; Fig. 3, an end view in elevation, the view being taken as indicated at line 3 of Fig. 1; Fig. 4, an enlarged detail, sectional view, the section being taken as indicated at line 4 of Fig. 1; Fig. 5, an enlarged detail, sectional view of the meat filling tube, the section being taken as indicated at line 5 of Fig. 1; Fig. 6, an enlarged detail, sectional view of the end of the suction chamber, the section being taken as indicated at line 6 of Fig. 7; and Fig. 7, a transverse, sectional view, the section being taken as indicated at line 7 of Fig. 6.

In the illustration given, A designates a frame; B, the meat stuffing apparatus; C, power cylinder apparatus; and D, trap mechanism for collecting withdrawn juices, etc.

The apparatus A may be of any suitable construction. In the illustration given, it consists of the standards 10 which support a platform 11. The trap member D is supported upon a lower platform 12 carried by the frame.

The meat stuffing apparatus B is shown best in Figs. 5, 6 and 7. A meat tube 13 is provided at its forward end with an integral flange 14. At its rear, the tube 13 is cut away to provide a meat opening 15 controlled by a closure lid or top 16. The lid 16 is pivotally supported upon tube 13 by the hinge 17. A yoke latch member 18 is pivoted at 19 and provided with a handle 20. The rear end portion of the closure lid or gate 16 is provided with a latch member 21 having an inclined forward surface by means of which the closure member may be forced to closed position and latched as the yoke member 18 is swung forwardly into the position shown in solid lines in Fig. 5. The tube 13 is supported upon the frame bed 11 by the bracket members 22 and 23.

The stuffing horn 24 extends forwardly of the member B and is adapted to receive the casing and to subject the interior of the casing to suction as the meat is pressed into the casing. The horn consists of an outer tube member 25 equipped at its rear end with an annular flange 26. Within the tube 25 is a second or inner tube 27 which is also provided with an annular flange 28. The flanges 26 and 28 are bolted to the integral flange 14 of tube 13 by the bolts and wing nuts illustrated. The inner tube 27 as best shown in Fig. 6 is provided at its forward end with an annular lip 29 which extends outwardly into line with the outer tube 25 leaving, however, a suction space 30 therebetween. A suction pipe 31 communicates with the space provided between the outer tube 25 and the inner tube 27. In the illustration given in Fig. 5, a casing 32 is shown extended over the outer tube 21 and gathered thereon.

Any suitable apparatus for pressing the meat within tube 13 and inner tube 27 into the casing may be employed. The apparatus C as illustrated consists of a compressed air cylinder 33 provided at its rear side with a piston 34 and a stem 35. The stem or shaft 35 which extends through a packing member at the forward end of the cylinder carries a plunger head 36 formed of hard rubber or any other suitable material. The head 36 fits within the tube 13 and is adapted to be thrust forwardly to advance the meat therein. A compressed air inlet 37 is provided at the rear of the air pressure cylinder 33 for advancing the piston 34 and stem 35. A return air inlet 38 is provided at the forward end of the cylinder so as to return the piston to its initial starting position.

A four-way valve 39 is provided, as shown in Fig. 3, for controlling the movement of compressed air. An inlet line 40 leading from a compressor leads to one port of the valve. An exhaust pipe 41 also leads from the valve. The air pipes 37 and 38 form the remaining two branches of the fitting controlled by the valve. The valve is operated by a lever 42 which is normally held in the position shown in Fig. 3 by spring 43. In this position, the compressed air lines are closed and the piston 34 retracted to the position illustrated in Fig. 4. For actuating the lever 42, a rod 44 extends downwardly and engages a treadle bar 45. The treadle bar 45 is pivoted at 46 and is equipped with a foot treadle 47.

The trap member D is designed for freeing the withdrawn air from moisture or juices and permitting the cleansed air to pass to a suction pump (not shown). The trap D comprises a container 48 provided interiorly with a baffle 49. The intake line 31 passes through the top portion of container 48 and thence downwardly under the baffle 49. The air then sharply reverses its direction and passes upwardly and out through line 50 leading to the suction device (not shown). A valve equipped liquid draw-off pipe 51 is provided at the bottom of trap D.

*Operation*

In the operation of the device, the operator draws a casing 32 upon the horn 24, the forward end of the casing being closed and the rearmost portion of the casing being preferably gathered, as illustrated in Fig. 5. The door or gate 16 is raised, as indicated in dotted lines in Fig. 5, and meat is introduced into the tube B. When sufficient meat has been introduced, the gate 16 is closed and the yoke member 18 drawn forward to locking position. The operator then depresses the treadle 47 so as to swing the valve lever to the position in which compressed air flows through pipe 37 into the rear of cylinder 33. This forces piston 34 forwardly and the pressure head or piston 36 is similarly pushed forward through tube 13 and finally the inner tube 27. As the meat is thus fed forwardly, suction is applied through pipe 31 and the chamber space between tubes 25 and 27. Air from between the extruded meat and the casing passes in over the lip 29 and through the space 30 into the vacuum chamber between tubes 25 and 27. Thence, the air and any moisture or juices carried along with it pass through pipe 31 and into trap D where the air is freed from the juices and the greater portion of the moisture. When the foot treadle 47 is released, the valve lever 42 swings upwardly under the influence of spring 43 and compressed air is allowed to flow through the pipe 38 into the forward end of the pressure cylinder 33. This causes piston 34 to move to the rear position illustrated in Fig. 4 and at the same time retracts the pressure head or piston 36 to the position shown in this figure.

The stuffing apparatus may easily be cleaned by simply removing the bolts holding flanges 14, 28 and 26, to remove the tubes 25 and 27. When removed, tubes 25 and 27 are loose from each other and easily cleaned on all surfaces. The reassembly of these parts is then effected merely by tightening the bolts securing the flanges together in the positions shown.

The apparatus is extremely simple and sure in operation, permitting a large amount of stuffing to be carried through within a short time, while at the same time greatly improving the finished product by bringing about the removal of air from the casing during the actual stuffing operation. The tedious working of the stuffed casings which has heretofore been made necessary in order to bring about the removal of part of the air and moisture is eliminated, while at the same time producing a superior product.

While in the foregoing specification, I have set forth certain specific steps and certain details of structure and operation, it will be understood that such steps and details may be varied widely by those skilled in the art without departing from the spirit of my invention.

I claim:

1. In casing stuffing apparatus, a casing support, means for stuffing the casing, means for subjecting the interior of said casing to suction during said stuffing operation, and guard means for preventing the removal of meat from said casing by said suction.

2. In apparatus for stuffing meat into casings, a stuffing horn adapted to receive an open end of a casing, a source of suction, a conduit between said source and said horn opening adjacent the discharge end of the horn for subjecting the interior of said casing to suction, guard means at the discharge end of the horn for preventing the removal of meat from said casing by said suction, and means for forcing meat into said casing.

3. In apparatus for stuffing meat into casings, a stuffing horn adapted to receive an open end of a casing, a source of suction, a conduit between said source and said horn for subjecting the interior of said casing to suction, baffle means extending between the meat in said casing and conduit for preventing the withdrawal of meat by said suction, and means for forcing meat into said casing.

4. In apparatus for stuffing meat into a casing, an elongated stuffing horn adapted to receive a flexible casing portion, a conduit communicating with said horn adjacent its discharge end, suction means for producing a reduced pressure in said conduit, guard means at the discharge end of the horn for preventing the removal of meat from said casing by said suction, and means for forcing meat through said horn and into said casing.

5. In apparatus for stuffing meat into casings, a double walled stuffing horn adapted to receive an open end of a casing, a source of suction, a conduit between said source and the space between the walls of said horn, the space between said walls communicating with the interior of said casing, and means for forcing meat into said casing.

6. In apparatus for stuffing meat into casings, a stuffing horn adapted to receive an open end of a casing, said horn being provided with double walls affording a suction chamber communicating with the interior of said casing, a baffle provided at the forward end of said horn about which the withdrawn air is required to flow, suction means communicating with said suction chamber, and means for forcing meat into said casing.

7. In apparatus for stuffing meat into casings, a double walled stuffing horn providing a suction chamber therebetween, said suction chamber communicating with the interior of a casing received upon said horn, suction means communicating with said suction chamber, a guard baffle carried by the inner of said walls and spaced forwardly of the outer of said walls, and means for forcing meat into said casing.

8. In apparatus for stuffing meat into casings, a stuffing horn adapted to receive an open end of the casing, said stuffing horn comprising an outer tube and an inner tube extending forwardly of said outer tube, said tubes providing between them a suction chamber, suction means communicating with said suction chamber, a baffle carried by the forward end of said inner tube and having its outer circumferential surface substantially aligned with the inner diameter of said outer tube, and means for forcing meat into said casing.

9. In apparatus for stuffing meat into casings, a tube, a plunger mounted therein for forcing meat therethrough, a stuffing horn removably secured to the forward end of said tube and consisting of separable inner and outer tubes, and suction means communicating with the space between said tubes.

10. In apparatus for stuffing meat into casings, a tube, plunger means for forcing meat through said tube, said tube being provided at its forward end with an outwardly extending flange, a stuffing horn comprising spaced tubes provided with outwardly extending flanges, means for releasably securing said stuffing horn tubes to said first-mentioned tube, and suction means communicating with the space between said stuffing horn tubes.

11. In a method for stuffing meat into casings, the steps of forcing the meat into a casing and simultaneously subjecting the interior only of the casing to the influence of reduced pressure.

12. In apparatus for stuffing meat into casings, a stuffing horn adapted to receive an open end of a casing, a source of suction, a conduit between said source communicating with said horn at its discharge end for subjecting the interior of said casing to suction, means for forcing meat into said casing, a guard lip at the forward end of said horn for preventing the withdrawal of meat under the influence of said suction, and a trap interposed in said conduit provided with a baffle about which the withdrawn air must pass.

13. In a method for stuffing meat into casings, the steps of forcing the meat into a casing, and continuously subjecting the meat within said casing to the influence of reduced pressure while maintaining atmospheric pressure upon the exterior of said casing.

JOHN E. DYREK.